Aug. 25, 1970 R. C. WICKER 3,525,570
PHOTOCOPIER OPTICAL SYSTEM TESTING
Filed March 22, 1967 2 Sheets-Sheet 2

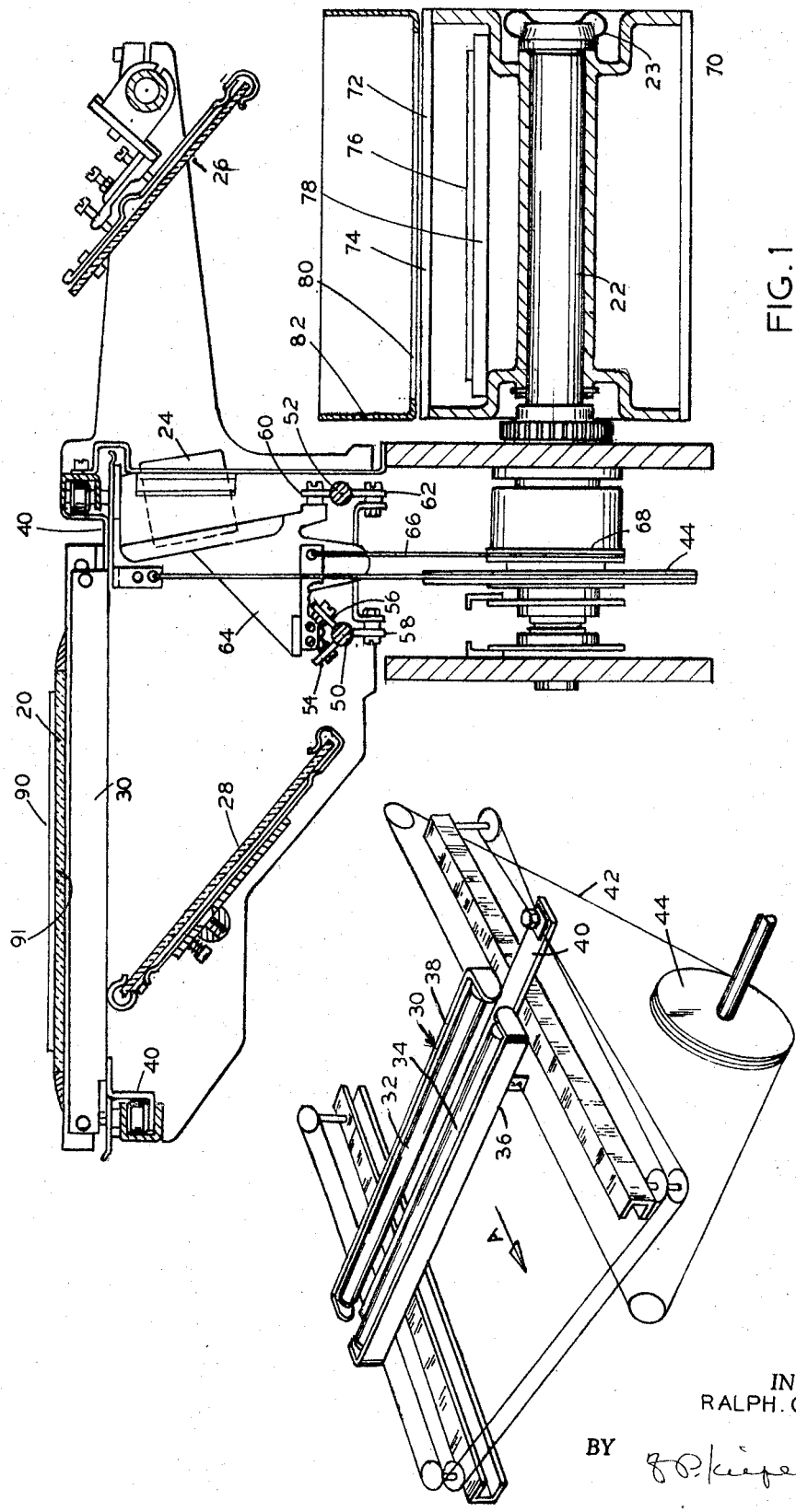

INVENTOR.
RALPH C. WICKER.
BY
ATTORNEY

United States Patent Office 3,525,570
Patented Aug. 25, 1970

3,525,570
PHOTOCOPIER OPTICAL SYSTEM TESTING
Ralph C. Wicker, Fairport, N.Y., assignor to Chesley F. Carlson Co., Minneapolis, Minn., a corporation of Minnesota
Filed Mar. 22, 1967, Ser. No. 625,099
Int. Cl. G03b 27/32; G01n 21/04
U.S. Cl. 356—72                            2 Claims

ABSTRACT OF THE DISCLOSURE

Method of producing an image in the approximate plane of the copy board from a pattern disposed at the surface of the light sensitive material and transmitted through the optical system, said pattern comprising a plurality of uniformly spaced extremely small dots of uniform size and spacing and arranged in straight lines, the dots being of a size to approximately cover about a half of the pattern area, and applying a dark screen having apertures many times more minute than said dots and all of like size and spacing and disposed on straight lines, the periodicity of the minute apertures being a few percent different from the periodicity of the dots in the image to produce an interference pattern readily discernible to the naked eye comprising apparent dots and spaces, the size of which in comparison to the image dots is in the order of the reciprocal of the difference between the spacing of the image dots and the spacing of the dark screen apertures divided by the spacing of the image dots, and determining by irregularity of the interference pattern thus produced, a maladjustment in the optical system.

This invention relates to the testing of the optical systems of photocopiers, to facilitate adjustment, and indicate maladjustment.

In photocopiers, there is employed an optical system for transmitting an image of the copy to be reproduced, such image, in an electrostatic photocopy being reproduced as a latent image upon an electroluminescent drum, belt or other receptor capable of reproducing the latent image. To avoid a relatively short focal length, due to the wide angle necessary to embrace the copy to be reproduced, or the latent image thereof, a folded optical system is used employing a pair of mirrors disposed on opposite sides of a lens. The opportunities for maladjustment in such a system, and the necessity for correct adjustment to reproduce photo copies clearly and faithfully is clearly evident. The practice of examining reproduced copy with the master to determine necessary adjustment is slow and wasteful. Testing by any other means has involved intricate equipment.

The present invention is directed to a simplified procedure and apparatus for testing such lens systems for adjustment or maladjustment. The procedure employs no intricate equipment, is performed by naked eye observation, and requires no extensive dismantling of the apparatus. More particularly the invention involves the use of interference magnification, and involves the substitution of an illuminated object in place of the electroluminescent drum. The illuminated object has a uniform pattern of illuminated dots all of uniform size, and arranged on parallel and transverse parallel lines equally spaced, the size of such dots, and the intervening dark areas being related to provide an efficient observable object on a surface located in exact correspondence with the location of the surface of the usual electroluminescent drum. The above is used in connection with an observation image plate, applied to the copy board, such image plate having a plurality of minute apertures, arranged and uniformly spaced along parallel and transverse parallel lines, with a periodicity a few percent different in both directions from the image of the illuminated object projected upon the plane of the copy board through the optical system. By orienting the lines of apertures in the observation plate in parallelism with the lines of dots in the illuminated object, interference magnification of the dots, observable by the naked eye appears at the observation image plate. Any irregularity in the size of the interference magnified dots, or in the alignment thereof at once provides evidence of maladjustment and the nature and degree thereof to facilitate readjustment and correction.

The above and other novel features will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 1 is a schematic diagram of a typical photocopier to which the invention has been applied;

FIG. 2 is a perspective fragmentary detail of the apparatus of FIG.1;

Figure 4:
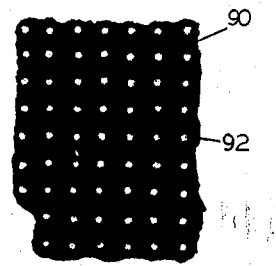
FIG. 4 is a greatly enlarged representation of an area of the observation image plate.

Referring to the drawings, FIGS. 1 and 2 which diagrammatically relate to and disclose a lens system similar to that of a photocopier disclosed in Mayo et al. 3,062,109, there is shown a transparent copy board 20, a drive shaft 22 for a drum having a photoconductive layer, a lens 24, and reflective mirrors 26 and 28. Beneath the copy board 20 is a scanning device 30 comprising lamps 32 and 34 with reflectors 36 and 38 for illuminating copy placed face downward on the copy board 20. Such lamps are mounted in a carriage 40 which moves from one end of the copy board to the other, as for example in the direction of arrow A, to scan the copy placed on the board from what may be referred to as from top to bottom. The linear rate of movement of such scanning device from one end of the sheet to the other is correlated so as to be the same as the peripheral speed of the drum carried on the shaft 22, where the lens is located in the center of the lens system for one to one reproduction, and the return of such scanning device may be at a faster rate.

In order to move the scanning carriage, a flexible cable drive 42 is provided that is driven by a pulley 44 journalled on shaft 22. In order to transmit through the optical system the narrow strip or line being scanned by the light carriage, upon a fixed elemental position in relation to the drum on shaft 22, the lens 24 is movably mounted to slide or roll on fixed rails or rods 50, 52 by rollers 54, 56 and 58, and 60 and 62 of a lens carriage 64. The traverse of such lens is caused to move at half the speed of the scanning carriage, by a cable drive 66, and a pulley 68 keyed to pulley 44, and of one half the diameter of pulley 44. Through a clutch arrangement, not shown, the pulleys 44 and 68 may be caused to be locked to the shaft 22 to move the scanning carriage from top to bottom while the lens carriage moves through its lesser range, and after which the scanning carriage and lens carriage are returned to their initial position by a spring return or other means, not shown.

The drum 70, mounted on the shaft 22 is a substitute for the photo conductive drum normally keyed to such shaft, and the cylindrical surface 72 of the drum 70 is of the exact same radius as the effective surface of the photo conductive drum, which latter is readily removed from the shaft by removing the wing nut 23. The drum 70, however, is not keyed to the shaft 22,: and is held fixed against rotation by any suitable means, not shown. The drum comprises a transparent or translucent cylindrical surface 74, the exterior surface of which has applied thereto preferably along elemental and circumferential lines a plurality of opaque dots 75 uniformly spaced and of a precise frequency such as 150 to the inch elementally and circumferentially. The combined area of the opaque dots may be about equal to the area not covered by the dots. Within the cylindrical surface is lamp 76 with an elongate parabolic reflector 78 for directing a uniform beam of light upwardly along a line parallel with the axis of the drum, and of a width at least as great as the slit 80 in the light shield 82.

Applied to the copy board 20 is an image observation plate 90, which may be a glass plate in the form of a substantially opaque negative having a plurality of pin hole light apertures 92 of a diameter of about 0.000066 of an inch, spaced apart on parallel and transverse parallel lines equally spaced, the pitch or frequency of which is a few percent different from the pitch or frequency of the dots 75. The plate 90 has its aperture alignment disposed parallel with the image of the lines of dots transmitted through the lens system from the drum 70, or parallel with the axis of the shaft 22, assuming the optical system is such as to require parallelism between the shaft 22 and the scanning line. With the substantially opaque surface 91 of plate 90 and its pinholes applied directly to the copyboard, the scanning lamps are turned out, and from the illumination of the drum surface 74 by lamp 76, an interference magnification will appear to the naked eye, consisting of apparent black dots, the spacing of which is primarily dependent upon the percent difference between the dot frequency at the drum and the aperture frequency of the opaque plate surface.

Figure 5:
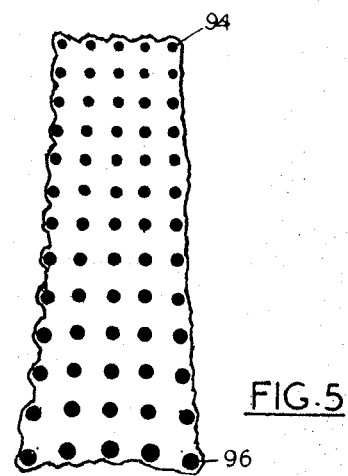
FIG. 5 is an illustrative view (full size) of the manner in which a maladjustment in the optical system may appear on the observation image plate.

If the lens 24, mirrors 26 and 28, and the drum axis are correctly located in respect to the plane of the copy board, the interference dots will appear as sharp black dots of uniform size and spacing clear across the field within the scanning frame, and the lines thereof crosswise will appear straight and parallel. Should for some reason the axis of the drum be inclined downward to the right and out of parallelism with the plane of the copy board, the lines of interference dots seen through the pin hole apertures will increase in size from right to left, and the lines diverge from right to left, and the dots on lines which should extend crosswise will appear on curved lines, that are convex facing to the right. The appearance may be a pattern having some similarity to that shown in FIG. 5, which is readily discernable to the naked eye without magnification merely by viewing the plate 90. As seen in FIG. 5 the dots 94 created by interference, at one end are small, while the dots at 96 created by interference at the other end, are larger and more widely spaced. It may be desirable to view the plate 90 in a darkened room, or by the use of a hood of dark cloth, so the interference effect can be easily seen.

If a mirror, or both mirrors 26 and 28 should be incorrectly located, or at an incorrect angle, or the lens be out of line or tilted, the interference pattern may be distorted at one end with respect to the other and the misalignment will be promptly indicated. Any deviation of a line of dots from lengthwise or crosswise of the copy board will also indicate maladjustment. Any adjustment to restore alignment can be made while viewing the interference pattern, and any adjustment that tends to restore the uniform size and straight alignment of the interference dots appearing through the screen 90, will generally be an adjustment in the correct direction.

If the periodicity of the dots 75 is precisely 150 to the inch, and the screen 90 is 2% less or more than 150 to the inch, or 147 or 153 to the inch, and the lens and mirrors are correctly adjusted to provide an image at the drum of the same size as at the copy board, the spacing between the dots in the interference pattern to be seen, will be in the order of about 3 to the inch, and all will be uniformly spaced and of uniform size, and thus indicate that the apparatus is in correct adjustment. Any variation between exact 1:1 ratio between the reproduced latent image at the drum and the object at the copy board can be compensated for by employing a dot periodicity at the surface 74, or a dot periodicity at the dark screen 90 with a corresponding variation. Since in photocopy machines, a one to one ratio or exact reproduction is the most desirable, the 2% variation between the pitch at the drum 74, and the dark screen 90 will be found to be effective.

Figure 3:
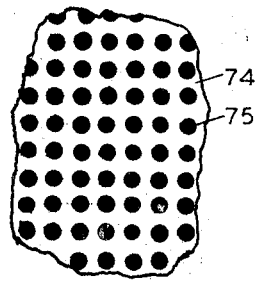
FIG. 3 is a greatly enlarged representation of an area of the illuminated surface of the substituted object drum.

While an illuminated transparent drum has been suggested, with the lamps 32 and 34 dark, it would be practical to provide an opaque drum with white background and black dots as indicated in FIG. 3, and by shifting the reflectors at the lamps 32 and 34, illuminate the drum surface from such lamps.

Since any irregularity in the pattern produced by the interference magnification directly indicates a maladjustment, corrective adjustments may be made while the effect of the corrective adjustments are being observed. This permits quick adjustments to be made and with practice, the nature of the irregularities in the interference magnification will acquaint the observer with the likely maladjustment, whether it be at the drum, the mirrors, the lens or an accumulation of the maladjustments of two or more of the items. Although the invention has been described in connection with apparatus employing a cylindrical light sensitive surface on a drum, the invention is equally applicable where the light sensitive surface is flat on a plate.

While a single embodiment of the invention has been illustrated and described with variations, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In xerography wherein copy on a transparent copy board is reproduced as a latent image on the surface of light sensitive xerographic material through an optical system including a lens, the method of testing said optical system comprising the steps of producing via the optical system an image in the approximate plane of the copy board from a pattern disposed at the approximate location of the surface of the light sensitive material, said pattern comprising a plurality of uniformly spaced extremely small opaque dots of uniform size and spacing and arranged in straight parallel lines, the dots being of a size to approximately cover about a half of the pattern area, placing in said approximate plane of the copyboard a dark screen having apertures many times more minute than said dots and all of like sizes and spacing and disposed on straight lines, the periodicity of the minute apertures being a few percent different from the periodicity of the dots in the pattern producing by superimposing said image upon said screen an interference pattern readily discernible to the naked eye comprising apparent dots and spaces, the size of said apparent dots in comparison to the image dots being of the order of the reciprocal of the difference between the spacing of the image dots and the spacing of the dark screen apertures divided by the spacing of the image dots, and determining by noting any irregularity of the interference pattern thus produced, a maladjustment in the optical system.

2. The method of claim 1 wherein the minute apertures in the dark screen are of the order of about .000066 inch in diameter and the spacing in the order of 150 dots to the inch.

References Cited

UNITED STATES PATENTS

| 2,977,846 | 4/1961 | Pettavel | 356—166 |
| 2,999,419 | 9/1961 | Benson | 356—156 |

RONALD L. WIBERT, Primary Examiner

J. ROTHENBERG, Assistant Examiner

U.S. Cl. X.R.

355—77; 356—156